United States Patent [19]

Cangini et al.

[11] Patent Number: 5,242,482
[45] Date of Patent: Sep. 7, 1993

[54] PROCESS FOR TREATING SPENT BATTERIES

[75] Inventors: Giuseppe Cangini, Rome; Luigi Figari, Milan; Luciano Moglie; Alessandro Pescetelli, both of Rome, all of Italy

[73] Assignee: Nuova Samim S.p.A., Milan, Italy

[21] Appl. No.: 821,071

[22] Filed: Jan. 16, 1992

Related U.S. Application Data

[63] Continuation-in-part of Ser. No. 762,740, Sep. 18, 1991, which is a continuation of Ser. No. 601,376, Oct. 23, 1990, abandoned.

[30] Foreign Application Priority Data

Oct. 26, 1989 [IT] Italy .................. 22146 A/89

[51] Int. Cl.$^5$ ............................. C22B 43/00
[52] U.S. Cl. .......................... 75/431; 75/693; 75/742
[58] Field of Search ............ 75/693, 742, 431

[56] References Cited

U.S. PATENT DOCUMENTS 4,149,879 4/1979 Loo .................................. 75/742

Primary Examiner—Peter D. Rosenberg
Attorney, Agent, or Firm—Oblon, Spivak, McClelland, Maier & Neustadt

[57] ABSTRACT

A process is described for treating spent batteries of any type, comprising essentially the following stages:

a) disintegrating the spent batteries in water to a piece size of less than 7 mm followed by stirring in water, then screening to obtain a pulverlent aqueous turbid fraction (underscreen fraction) and a coarse fraction (overscreen fraction);

b) stirring the pulverulent aqueous turbid fraction at a pH of between 7 and 8, followed by filtering by which the solids are separated from the aqueous solution, which is fed to water treatment;

c) removing mercury both from the coarse fraction of point a) and from the separated solids of point b) in an indirectly heated continuously rotating mercury removal furnace operating in total absence of air and to which calcium hydroxide has been added, to obtain residues essentially free of mercury.

10 Claims, No Drawings

PROCESS FOR TREATING SPENT BATTERIES

This Application is a continuation-in-part of Ser. No. 07/762,740, filed Sep. 18, 1991 which is a continuation of Ser. No. 07/601,376 filed Oct. 23, 1990, now abandoned.

This invention relates to a process for treating spent batteries. The reason for which spent batteries are treated is basically ecological, namely the separation, removal and recovery not only of mercury, the component considered most harmful, but also of other harmful components such as Zn, Fe, Mn, Cd, Pb, Ni, Cl−, $NH_4^+$, KOH, Cr etc. A further reason is to recover certain battery components (manganese, iron, zinc, cadmium, nickel etc.).

Conventional pyrometallurgical treatment process consist essentially of the following stages:
disintegrating the batteries
heat treating them in a furnace to an average of 600°–800° C.
condensing and separating the evolved mercury from the gas in the furnace
variously treating the furnace residue for coarse separation of the main components (Fe, Mn, Zn).

Other processes of hydrometallurgical type are also known in which after the batteries have been disintegrated the ground material is dissolved in one or more suitable solvents (nitric, hydrochloric, sulphuric, acetic or other acid) to obtain a preliminary separation of the various battery components, followed by known treatment (electrolysis, cementation, precipitation etc.) to effect more thorough separation and obtain a commercial product. In general it can be said that the greatest drawbacks of said processes are their operating cost and their danger in the sense that during heat treatment in the furnace gaseous combinations of mercury, chlorides, organic substances, ammonia, heavy metals (cadmium, lead, zinc etc.) form and require considerable and careful control.

Even in processes which use solvents toxic compounds such as hydrogen, acid mists etc. can form by reaction with strong acids. These are also very complicated processes in that although dissolving with a particular acid can solve the problem of one particular component, it leaves an intimate mixture of the other components (for example in a common solution) such that their subsequent separation becomes very complicated. Another type of known process is that described in the patent application DE 247023.

This process comprises essentially:
a very complicated initial stage of grinding, screening and magnetically separating the components to give four streams, namely:
a first stream containing magnetic scrap (Fe)
a second stream consisting mainly of alkaline batteries which have not undergone disintegration
a third non-magnetic stream (paper, plastic, unopened batteries)
a fourth stream consisting of the pulverulent part of the underscreen fraction (fine black mass);
the fourth stream to which the black mass and non-magnetic part from the first and second streams have been added is washed with water to remove alkaline and ammonium salts and is then added to the third stream and treated in a mercury removal furnace, from which a gaseous stream emerges containing mercury and organic compounds, this then being subjected to after-burning and mercury condensation, this then being left in the furnace a residue which is fed to a WAELZ furnace for Zn, Cd and Pb separation, this furnace also leaving a residue which is treated with sulphuric acid to obtain a manganese dioxide residue and a manganese sulphate solution;
mercury is removed from the first stream in a furnace, the residue from which is re-ground and re-separated mechanically to obtain a final iron product and a fine residue which is added to the main fines cycle (fourth stream);
the second stream is ground in suitable grinders and heattreated to provide a magnetic part which is added to the first stream, and a non-magnetic pulverulent part which is added to the fourth stream.

In particular, it can be noted from the scheme described in DE 247023 that the third stream is fed directly to the mercury removal furnace without prior washing, and that the first stream and second stream are heated above 300° C. (700° C. and 318° C. max respectively) before washing.

This results in the same problems as those encountered in the aforesaid prior processes although to a slightly lesser extent, in that harmful gaseous combinations of mercury, chlorides, organic substances, heavy metals, ammonia etc. are formed both during the heat treatment and in particular in the mercury removal furnace. We have now discovered a process which obviates the drawbacks of processes of the prior art and provides the following substantial advantages:
considerable environmental hygiene as the process operates with water at ambient temperature and the mercury removal furnace operates at a lower average temperature in the practical absence of chlorides, ammonia, potash etc, so preventing the formation of any harmful and/or unforseen compound;
a practically total mercury removal from the residues down to a final 1-2 g/t of Hg;
low operating cost and high working safety.
removal of at least 70% of the chlorine and at least 60% of the sulphur which enter then furnace with the charge. The process of the present invention for treating spent batteries of any type comprises essentially the following stages:
a) disintegrating the spent batteries in water to a piece size of less than 7 mm followed by stirring in water for a time preferably exceeding 20 minutes, then screening to obtain a pulverulent aqueous turbid fraction (underscreen fraction) and a coarse fraction (overscreen fraction);
b) stirring the pulverulent aqueous turbid fraction at a pH of between 7 and 8, followed by filtering by which the solids are separated from the aqueous solution, which is fed to water treatment;
c) removing mercury both from the coarse fraction of point a) and from the separated solids of point b) in an indirectly heated continuously rotating mercury removal furnace operating in total absence of air and to which calcium hydroxide has been added, to obtain residues essentially free of mercury.

The disintegration unit must be able to accept spent batteries of all sizes and of all types of electrochemical system. The disintegration operation, effected as heretofore described, enables completely open disintegrated pieces (i.e. not flattened or closed about themselves) to be obtained, so facilitating the subsequent release of the paste contained in the batteries and the complete dissolution of the salts.

In addition, as this disintegration takes place in a stream of water, the short-circuited batteries are cooled and a preliminary salt dissolution is achieved.

By operating in this manner, any vapour development (particularly ammonia) is prevented. In stage b) in which the turbid fraction is stirred and then filtered, the salts present are totally dissolved, with separation of the paste contained in the batteries from the coarse metal parts.

This total dissolution of the salts (mainly sodium and aluminium chlorides) enables the subsequent thermal operations to take place continuously and under optimum conditions (so preventing furnace incrustation and corrosion of the same due to the presence of salts). Moreover, the salts contained in the batteries can be recovered at industrial purity, free of toxic and harmful contaminants. The mercury removal furnace operates at a temperature of preferably less than 700° C. and more preferably of between 500° and 630° C.

As stated, calcium hydroxide in a quantity preferably of between 10 and 500 kg/h is added to the furnace during the mercury removal in order to eliminate chlorine and gaseous sulphur by removing them from the process gas stream fed to purification. A more detailed description of the recommended mercury removal furnace will now be given.

The recommended mercury removal furnace consists of a horizontal cylindrical drum rotating about its longitudinal axis.

The solid material in the form of disintegrated batteries is fed into one end of the furnace and advances through the entire length of the drum, to be discharged at its opposite end.

The advancement and the continuous remixing of the material within the furnace is achieved both by the rotary movement of the furnace and by the presence of suitable blades welded to the inside of the shell.

To ensure furnace safety it is advisable that:
both ends of the furnace be provided with mechanical seals which totally prevent air entry into the furnace, these seals in addition being purged with nitrogen so that when they undergo wear, nitrogen (an inert gas from the combustion aspect) enters instead of air;
the solid material loading and discharge devices are such as to prevent air infiltration;
the environment within the shell be purged continuously with a stream of inert gas completely free of oxygen (such as nitrogen or carbon dioxide), to remove combustible or toxic vapour released from the treated material.

The furnace can be heated externally by methane burners controlled on the basis of the temperature of the shell wall.

The unit comprising the rotary furnace and the external heating burners is preferably installed within a refractory chamber to minimize heat dispersion to the outside.

The residues from the mercury removal furnace can be used as raw material for the manganese and ferrous alloy industries or can be fed to metallurgical plants of the WAELZ or Imperial Smelting type for recovering zinc, lead and cadmium, and for slagging or manganese and iron recovery, or can have their magnetic fraction removed followed by subjecting the iron-removed residue to hydrometallurgical separation (electrolysis, cementation etc.) for main Zn-Mn separation.

A further alternative is to subject said residues to screening, from which a fine fraction (mainly $MnO_x$) is obtained together with a coarse fraction from which iron and zinc scrap are individually separated.

The pulverulent turbid fraction is preferably stirred for a time exceeding 20 minutes.

All the ammonium compounds are retained in the aqueous solution obtained from the filtration of the pulverulent aqueous turbid fraction before being fed to water treatment.

With regard to the coarse fraction (over-screen fraction) of point a) this can be sorted (before mercury removal) to separate plastics from the other metal or non-metal components. The plastics are then washed to recover any pulverulent residues, which are added together with the wash water to the pulverulent aqueous turbid fraction of point a), and the metal and non-metal components are fed to the mercury removal furnace of point c).

The invention will be more apparent from the flow diagram of FIG. 1 which shows a non-limiting embodiment thereof. (Those stages which are not obligatory, i.e. are either preferred or optional, are shown by dashed lines on the flow diagram).

The feedstock 1 consisting of dry batteries of any kind (alkaline, acid, nickel-cadmium, mercury etc.) is firstly disintegrated in a knife mill 2, then washed in a wash drum 3 with water 4 (to dissolve all the chlorides, precipitate all the insoluble salts of zinc, manganese and other heavy metals, and further facilitate the important separation and cleaning of the ground pieces with easier subsequent separation of the plastics from the metal parts attached to them), then screened in a 2-4 mm mesh vibrating rotary screen 5 kept under a water spray 6, by means of which two streams are obtained, these being a pulverulent aqueous turbid fraction 7 and a coarse fraction 8 comprising pieces with an average size of less than 7.5 cm.

The coarse fraction 8 can optionally undergo separation in a hydro-gravimetric machine 9, to which water 10 is also fed, in order to separate the plastic parts 11 from the heavy metal and non-metal components 12 by floating.

The plastic parts 11 are then washed at 13 with a slightly acid aqueous solution containing 1-2 ppm of an industrial surfactant; and are then rinsed on a screen with water 14 to wash away any pulverulent residues 15 which may still be attached, these then being added to the turbid fraction 7 together with the wash water. The stream 16 represents the washed plastic pieces, which can be dumped.

The turbid fraction 7 is stirred in a vat 17 at pH 7-8 with the addition of a few ppm (of NaHs), followed by filtration 18 to separate the solids (containing mercury) 19 which are added to the stream 12. The filter panel is washed with water.

The combined streams 12 and 19 are fed to a mercury removal furnace 20 to which calcium hydroxide 31 is added and from which the mercury leaves in the form of gas 21 (to be condensed).

The residue 22 from the mercury removal furnace can be screened in a vibratory screen 23 to separate it into a pulverulent part 24 and a coarse part 25, which can be fed to magnetic separation 26 to separate iron scrap 27 from zinc, brass and graphite 28.

The aqueous solution leaving the filter 18 is fed to water treatment at 30.

An example of the process carried out in accordance with the scheme of FIG. 1 but without the stages shown by dashed lines in the figure will now be given.

EXAMPLE

| | |
|---|---|
| Feedstock (1): | 1000 kg of alkaline, acid, nickel-cadium, mercury and other batteries |
| Wash water (4): | 8000 liters |
| Coarse fraction (8): | 379 kg divided as follows: |
| | 220 kg of Fe (0.0175% Hg content) |
| | 36 kg of plastic (0.013% Hg) |
| | 75 kg of Zn (0.0415% Hg) |
| | 35 kg of graphite (0.0415% Hg) |
| | 10 kg of brass |
| | 3 kg of paper (0.015% Hg) |
| | ($Cl^-$ practicaly absent) |
| Pulverulent turbid fraction (7) containing: | water ($Cl^-$, $NH_4^+$, $K^+$ in solution) |
| | MnO, $MnO_2$, $MnO_3$ (solids) |
| | ZnO (solid) |
| | carbon black - powdered graphite (solid) |
| | powdered zinc (solid) |
| | paper fibers |
| Solids (19): | 460 kg of dry solid divided into the following percentages (by weight): |
| | Zn     22% |
| | Mn     37% |
| | Cd     0.0065% |
| | Hg     0.26% |
| | carbon black     8.8% |
| | $Cl^-$     0.06% |
| Aqueous solution (29): | 7940 liters (pH 8.9) containing: |
| | Hg     100 mg/l |
| | Zn     600 mg/l |
| | Cd     6 mg/l |
| | K     15,000 mg/l |
| | $Cl^-$     24,000 mg/l |
| | $NH_4^+$     6,300 mg/l |

With regard to the paper, a part is pulped during the various washes, whereas a part remains attached to the screens from which it is removed by scraping with brushes which reduce it to fibre, it therefore going into the solids (19);

Average temperature of the mercury removal furnace: 480° C.

Calcium hydroxide added: 100 kg/h

Residue (22) from mercury removal furnace: Hg=0.00014% (1.4 g/t).

We claim:

1. A process for treating spent batteries of any type, comprising the following steps:
    a) providing spent battery disintegrating means, said means arranged such that disintegration of the spent batteries takes place in water;
    b) disintegrating the spent batteries in water in said disintegrating means to a piece size of less than 7 mm followed by stirring in water, then screening to obtain a pulverulent aqueous turbid fraction (underscreen fraction) and a coarse fraction (overscreen fraction);
    c) stirring the pulverant aqueous turbid fraction at a pH of between 7 and 8, followed by filtering by which the solids are separated from the aqueous solution, which is fed to water treatment;
    d) removing mercury both from the coarse fraction of step b) and from the separated solids of step c) in an indirectly heated continuously rotating mercury removal furnace operating in total absence of air and to which calcium hydroxide has been added, to obtain residues essentially free of mercury.

2. A process as claimed in claim 1, wherein the quantity of calcium hydroxide fed into the mercury removal furnace is between 10 and 500 kg/h.

3. A process as claimed in claim 1, wherein the mercury removal furnace operates at a temperature of less than 700° C.

4. A process as claimed in claim 3, wherein the mercury removal furnace operates at a temperature of between 500° and 630° C.

5. A process as claimed in claim 1, wherein the residues of the mercury removal furnace are subjected to screening, from which a fine fraction and a coarse fraction are obtained, this latter undergoing sorting to obtain separate iron and zinc scrap.

6. A process as claimed in claim 1, wherein the disintegrated batteries are stirred in water for a time exceeding 20 minutes.

7. A process as claimed in claims 1 or 2, wherein the pulverulent aqueous turbid fraction is stirred for a time exceeding 20 minutes.

8. A process as claimed in claim 1, wherein the coarse fraction (overscreen) of step b is sorted to separate the plastics from the other metal and non-metal components, the plastics being then washed to recover the powdery residues, which together with the wash water are added to the pulverulent aqueous turbid fraction of step b, the metal and non-metal components being fed to the mercury removal furnace of step d.

9. A process as claimed in claim 1, wherein the mercury removal furnace is purged with inert gas.

10. A process as claimed in claim 1, wherein the mercury removal furnace is provided at both ends with mechanical seals.

* * * * *